(12) United States Patent
Welsh et al.

(10) Patent No.: US 12,214,869 B2
(45) Date of Patent: Feb. 4, 2025

(54) VIBRATION CONTROL ASSEMBLY

(71) Applicant: Lockheed Martin Corporation, Bethesda, MD (US)

(72) Inventors: William A. Welsh, New Haven, CT (US); Yuriy Gmirya, Woodbridge, CT (US); Damaris R. Zachos, Lyme, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 18/488,320

(22) Filed: Oct. 17, 2023

(65) Prior Publication Data

US 2024/0059405 A1 Feb. 22, 2024

Related U.S. Application Data

(62) Division of application No. 16/852,698, filed on Apr. 20, 2020, now Pat. No. 11,794,883.

(51) Int. Cl.
*B64C 27/00* (2006.01)
*F16F 15/22* (2006.01)
*F16F 15/30* (2006.01)

(52) U.S. Cl.
CPC .......... *B64C 27/001* (2013.01); *F16F 15/223* (2013.01); *F16F 15/30* (2013.01); *F16F 2222/08* (2013.01)

(58) Field of Classification Search
CPC ............ B64C 27/001; B64C 2027/002; B64C 2027/003; F16F 15/223; F16F 15/30; F16F 2222/08; F16F 15/02; F16F 15/315; F16F 1/00
See application file for complete search history.

(56) References Cited

U.S. PATENT DOCUMENTS

| | | | | |
|---|---|---|---|---|
| 2,369,845 A | * | 2/1945 | Noxon | G01C 19/26 74/5.1 |
| 2,422,267 A | * | 6/1947 | Summers, Jr. | G01C 19/26 74/5.1 |
| 2,722,124 A | * | 11/1955 | Smith | G01C 19/26 74/5.1 |
| 2,856,777 A | * | 10/1958 | Krupick | G01C 19/38 74/5.4 |

(Continued)

OTHER PUBLICATIONS

Final Office Action on U.S. Appl. No. 16/852,698 dated Mar. 31, 2023 (13 pages).

(Continued)

*Primary Examiner* — Medhat Badawi
(74) *Attorney, Agent, or Firm* — Foley & Lardner LLP

(57) ABSTRACT

A vibration control assembly includes a housing having an interior region and an inner mass including a cage disposed within the interior region of the housing and being rotatable within the housing about a first axis and a gyroscope wheel disposed within the cage and rotatable about a second axis other than the first axis. At least one driving source includes a stator and is operable to interact with a magnetic field of the inner mass to drive rotation of the inner mass about at least one of the first axis and the second axis, wherein the at least one driving source is mounted within the interior region of the housing.

17 Claims, 11 Drawing Sheets

(56) References Cited

U.S. PATENT DOCUMENTS

| | | | | | |
|---|---|---|---|---|---|
| 2,887,885 | A | * | 5/1959 | Lackey | G01C 19/42 74/5.5 |
| 2,925,736 | A | * | 2/1960 | Mueller | G01P 15/14 73/504.18 |
| 2,934,961 | A | * | 5/1960 | Katz | G01C 19/30 74/5.4 |
| 3,265,335 | A | * | 8/1966 | McPherson | B64C 17/06 244/79 |
| 3,524,356 | A | * | 8/1970 | Myall | G01C 19/22 74/5.6 D |
| 3,527,108 | A | * | 9/1970 | Fay | G01C 19/04 74/5.34 |
| 3,555,692 | A | * | 1/1971 | Aberle et al. | G01C 19/38 33/326 |
| 3,931,742 | A | * | 1/1976 | Shirley | G01C 19/26 475/269 |
| 3,979,090 | A | * | 9/1976 | Brickner | G01C 21/18 244/175 |
| 4,397,185 | A | * | 8/1983 | Craig | G01P 15/14 74/5 F |
| 4,518,313 | A | * | 5/1985 | Jensen | F03D 80/00 416/18 |
| 4,597,347 | A | * | 7/1986 | Spanopoulos | B63H 9/1042 114/106 |
| 4,764,827 | A | * | 8/1988 | Kanai | G11B 15/103 360/95 |
| 5,089,418 | A | * | 2/1992 | Shaw | G01N 35/00029 422/63 |
| 5,368,271 | A | * | 11/1994 | Kiunke | G01C 21/18 248/187.1 |
| 5,386,738 | A | * | 2/1995 | Havenhill | G01C 19/30 74/5.22 |
| 5,419,212 | A | * | 5/1995 | Smith | B64G 1/32 74/5.1 |
| 5,628,267 | A | * | 5/1997 | Hoshio | B63B 39/04 244/165 |
| 6,834,561 | B2 | * | 12/2004 | Meffe | B64G 1/286 74/5.6 R |
| 6,973,847 | B2 | * | 12/2005 | Adams | B63B 39/04 |
| 7,097,140 | B2 | * | 8/2006 | Staley | B64G 1/28 244/165 |
| 7,997,157 | B2 | * | 8/2011 | Smith | B64G 1/286 74/5.47 |
| 8,002,251 | B2 | * | 8/2011 | Hindle | F16C 27/04 74/5.5 |
| 8,205,514 | B2 | * | 6/2012 | Stevens | B64G 1/286 74/5.7 |
| 8,312,782 | B2 | * | 11/2012 | McMickell | B64G 1/286 74/5.37 |
| 9,781,313 | B2 | * | 10/2017 | Pan | A45F 5/10 |
| 10,906,636 | B2 | * | 2/2021 | Welsh | F16F 15/02 |
| 11,235,868 | B2 | * | 2/2022 | Welsh | F16F 15/02 |
| 11,345,460 | B1 | * | 5/2022 | Joo | B64C 13/50 |
| 2004/0035229 | A1 | * | 2/2004 | Meffe | B64G 1/286 74/5.6 A |
| 2005/0075210 | A1 | * | 4/2005 | Frederickson | F03G 3/00 475/346 |
| 2009/0116963 | A1 | * | 5/2009 | Welsh | F16F 15/145 416/43 |
| 2010/0003133 | A1 | * | 1/2010 | Welsh | B64C 27/001 416/31 |
| 2010/0275705 | A1 | * | 11/2010 | Johnson | B64G 1/283 74/5.5 |
| 2011/0027081 | A1 | * | 2/2011 | Jolly | F16F 15/223 416/31 |
| 2011/0217171 | A1 | * | 9/2011 | Welsh | F16F 15/36 416/145 |
| 2012/0232780 | A1 | * | 9/2012 | Delson | A63F 13/285 340/407.1 |
| 2013/0233100 | A1 | * | 9/2013 | Kim | G01C 19/06 74/5.95 |
| 2014/0191626 | A1 | * | 7/2014 | Hollis, Jr. | H02K 7/025 310/68 B |
| 2017/0334553 | A1 | * | 11/2017 | Welsh | F16F 1/00 |
| 2017/0343695 | A1 | * | 11/2017 | Stetson | G01V 3/101 |
| 2019/0002125 | A1 | * | 1/2019 | Bin | F16M 11/2071 |
| 2019/0199164 | A1 | * | 6/2019 | Gieras | H02K 7/025 |
| 2020/0132521 | A1 | * | 4/2020 | Akiba | C03C 17/28 |
| 2020/0156598 | A1 | * | 5/2020 | Lee | B60H 3/00 |
| 2020/0255127 | A1 | * | 8/2020 | Eberle | B64C 27/04 |
| 2021/0139137 | A1 | * | 5/2021 | Kopp | H02P 5/51 |
| 2021/0323658 | A1 | * | 10/2021 | Welsh | F16F 15/30 |
| 2023/0021908 | A1 | * | 1/2023 | Trainham | B60L 15/2036 |

OTHER PUBLICATIONS

Non-Final Office Action on U.S. Appl. No. 16/852,698 dated Nov. 25, 2022 (15 pages).

Notice of Allowance on U.S. Appl. No. 16/852,698 dated Jun. 22, 2023 (9 pages).

* cited by examiner

VIBRATION CONTROL ASSEMBLY

CROSS-REFERENCE TO RELATED APPLICATIONS

This application is a divisional of U.S. patent application Ser. No. 16/852,698, filed on Apr. 20, 2020, the content of which is incorporated herein by reference in its entirety.

BACKGROUND

The subject matter disclosed herein relates to aircraft, and more particularly, to a vibration control assembly for controlling aircraft vibration with one or more gyroscope assemblies.

Helicopter rotors produce undesirable vibratory hub moments that cause unwanted fuselage vibration. The largest moments are in the pitching and rolling moment directions. These moments produce an elliptical shape as time progresses. More generally, there are three moments which produce an ellipsoidal shape. Typically, active vibration control techniques use linear vibratory force actuators placed some distance apart in order to create a countering or anti-vibration moment. This approach undesirably adds significant weight because the linear actuators rely upon linearly oscillating parasitic masses to generate load. However, the amplitudes of mass oscillation are limited due to space or other constraints, resulting in heavy designs that are deemed inefficient based on the moment produced relative to the weight. The reduction in payload capability of the aircraft is not desirably offset by the benefits associated with the counter-moment effects of these linear vibratory force actuators.

BRIEF DESCRIPTION

According to an embodiment, a vibration control assembly includes a housing having an interior region and an inner mass including a cage disposed within the interior region of the housing and being rotatable within the housing about a first axis and a gyroscope wheel disposed within the cage and rotatable about a second axis other than the first axis. At least one driving source includes a stator and is operable to interact with a magnetic field of the inner mass to drive rotation of the inner mass about at least one of the first axis and the second axis, wherein the at least one driving source is mounted within the interior region of the housing.

In addition to one or more of the features described above, or as an alternative, in further embodiments the at least one driving source is operable to rotate the inner mass about both the first axis and the second axis.

In addition to one or more of the features described above, or as an alternative, in further embodiments rotation of the inner mass about the first axis and the second axis can be controlled independently.

In addition to one or more of the features described above, or as an alternative, in further embodiments the at least one driving source includes a first driving source operatively coupled to the cage to rotate the cage and a second driving source operatively coupled to the gyroscope wheel to rotate the gyroscope wheel about the second axis.

In addition to one or more of the features described above, or as an alternative, in further embodiments the second driving source rotates with the cage about the first axis.

In addition to one or more of the features described above, or as an alternative, in further embodiments the at least one driving source is powered wirelessly.

In addition to one or more of the features described above, or as an alternative, in further embodiments when supplied with a current, the at least one driving source generates a magnetic field that interacts with the magnetic field of the inner mass.

In addition to one or more of the features described above, or as an alternative, in further embodiments when supplied with a current, the at least one driving source is operable to induce a current in a portion of the inner mass.

In addition to one or more of the features described above, or as an alternative, in further embodiments the at least one driving source is an induction motor and the portion of the inner mass includes a ferromagnetic material.

In addition to one or more of the features described above, or as an alternative, in further embodiments the at least one driving source is a brushless motor and the inner mass includes one or more permanent magnets.

According to another embodiment, an aircraft includes an airframe and a rotor system mounted to the airframe. The rotor system is rotatable about a rotor axis and which imparts a vibration into the airframe. At least one vibration control assembly operably is coupled to at least one of the rotor system and the airframe to suppress the vibration. The at least one vibration control assembly includes a housing having an interior region, an inner mass disposed within the interior region of the housing including a first portion rotatable about a first axis and a second portion coupled to the first portion rotatable about a second axis. A driving source mounted within the interior region of the housing is operable to interact with a magnetic field of the inner mass to rotate the inner mass about at least one of the first axis and the second axis.

In addition to one or more of the features described above, or as an alternative, in further embodiments the at least one vibration control assembly includes a plurality of vibration control assemblies spaced about the aircraft.

In addition to one or more of the features described above, or as an alternative, in further embodiments the driving source is operable to rotate the inner mass about both the first axis and the second axis.

In addition to one or more of the features described above, or as an alternative, in further embodiments rotation of the inner mass about the first axis and the second axis can be controlled independently.

In addition to one or more of the features described above, or as an alternative, in further embodiments the driving source is a motor including a stator assembly and a rotor assembly and the inner mass defines the rotor assembly.

In addition to one or more of the features described above, or as an alternative, in further embodiments the driving source is an induction motor and the inner mass includes a ferromagnetic material.

In addition to one or more of the features described above, or as an alternative, in further embodiments the driving source is a brushless motor and the inner mass includes one or more permanent magnets.

In addition to one or more of the features described above, or as an alternative, in further embodiments the inner mass further comprises a cage rotatable within the housing about the first axis and a gyroscope wheel disposed within the cage and rotatable about the second axis.

In addition to one or more of the features described above, or as an alternative, in further embodiments at least one of the cage and the gyroscope wheel is rotated at a constant speed.

In addition to one or more of the features described above, or as an alternative, in further embodiments the driving source includes a first driving source operable to rotate the cage about the first axis and a second driving source operable to rotate the gyroscope wheel about the second axis, the first driving source and the second driving source being distinct.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
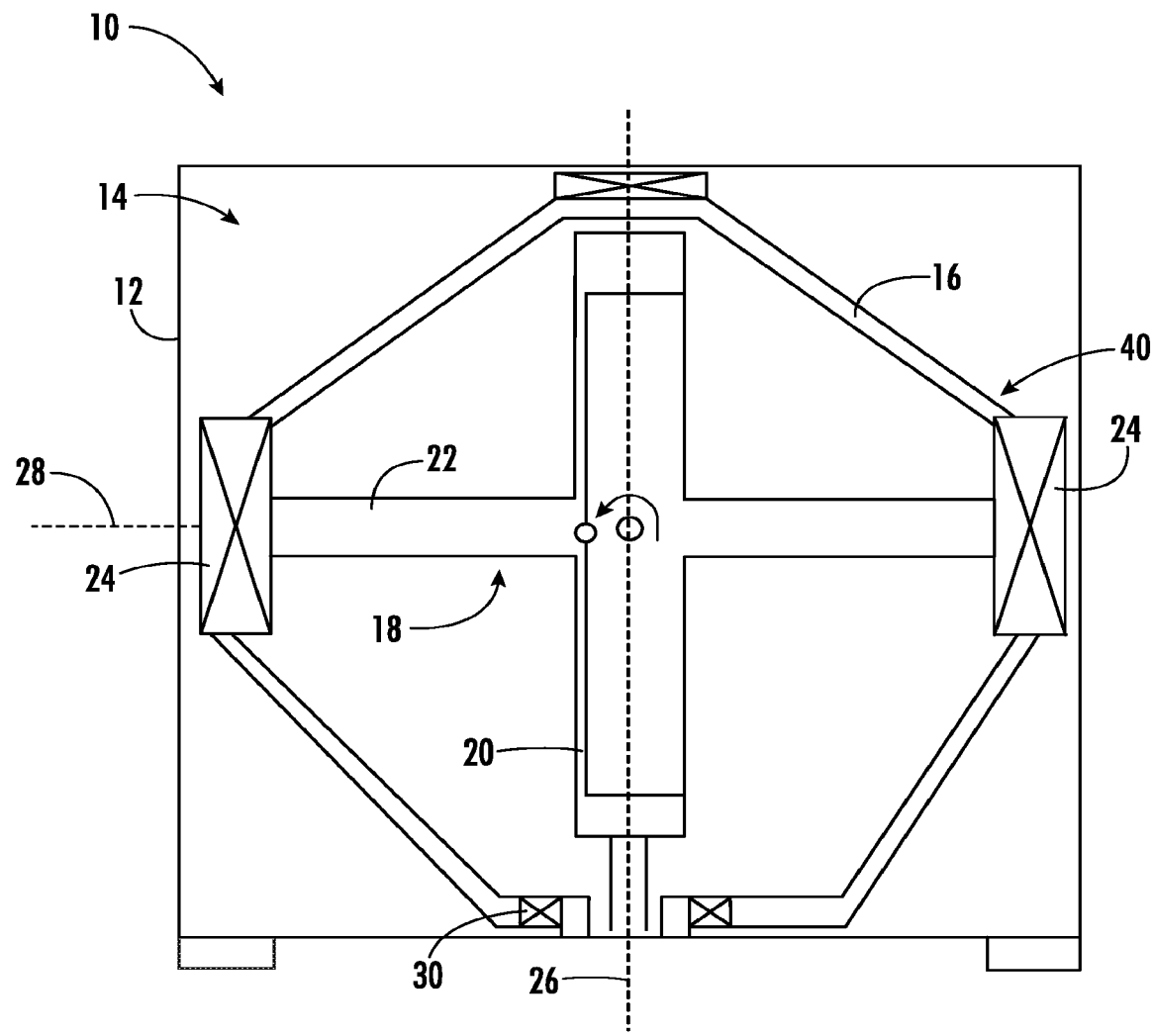
FIG. 1 is cross-sectional view of a vibration control assembly according to an embodiment.

Referring now to FIG. 1, an active vibration control system that employs one or more vibration control moment gyroscopes, also referred to herein as a vibration control assembly 10 is illustrated. It is contemplated that any structure, particularly vehicles that inherently produce vibration may benefit from the counteracting vibration moments as described herein. One such structure is an aircraft, such as a helicopter that is subjected to vibration due to moments generated by a rotor. The vibration control assembly 10 counters the vibratory moments to reduce overall vibrations to which the structure (for example aircraft) is subjected. In the case of a helicopter, the vibration control assembly 10 may be operatively coupled to a location proximate to the main transmission.

The vibration control assembly 10 includes a housing 12 that is operatively coupled to the structure that is to undergo vibration reduction. The housing 12 may be operatively coupled to the structure in any suitable manner including mounting with mechanical fasteners or welded thereto. The housing 12 defines an interior region 14. A cage 16 is disposed within the interior region 14. In the illustrated embodiment, the cage is formed of an octagon cross-section; however, it should be appreciated that various alternative geometries are also within the scope of the disclosure.

Irrespective of the geometry of the cage 16, a gyroscope wheel 18 is disposed within the cage 16. The gyroscope wheel 18 includes a wheel segment 20 mounted about a gyroscope shaft 22. Each end of the gyroscope shaft 22 is coupled to the cage 16 via a gyroscope bearing 24 such that the gyroscope wheel 18 is retained within the cage 16. It should be appreciated that the gyroscope wheel 18 can be connected to the gyroscope bearings 24 via any suitable means, including but not limited to a hollow shaft or a hollow cone-shaped shaft connecting the outer diameter of the gyroscope wheel 18 to the inner diameter of the bearing 24 for example.

The cage 16 is rotatable within the housing 12 about a first axis 26 and the gyroscope wheel 18 is rotatable within the cage 16 about a second axis 28. Accordingly, together the cage 16 and the gyroscope wheel 18 form a rotatable inner mass 40. The gyroscope bearings 24 are low friction bearings that allow the gyroscope wheel 18 to rotate at a high rate (e.g., up to 20,000 rpm), while also carrying a resulting gyroscopic moment that is produced. The rotation of the gyroscope wheel 18 produces equal and oppositely directed forces on the two bearings 24. These oppositely directed forces are equivalent to a moment that is exerted on the cage 16 producing equal and oppositely directed forces on cage bearings 30 (FIG. 1) that are located at opposite ends of the cage 16 proximate an interface between the cage 16 and the housing 12. The equal and oppositely directed forces on the cage bearings 30 form a moment on the housing 12 and subsequently that is passed to the structure to which the housing 12 is mounted, thereby countering moments produced by the structure itself.

Figure 2:
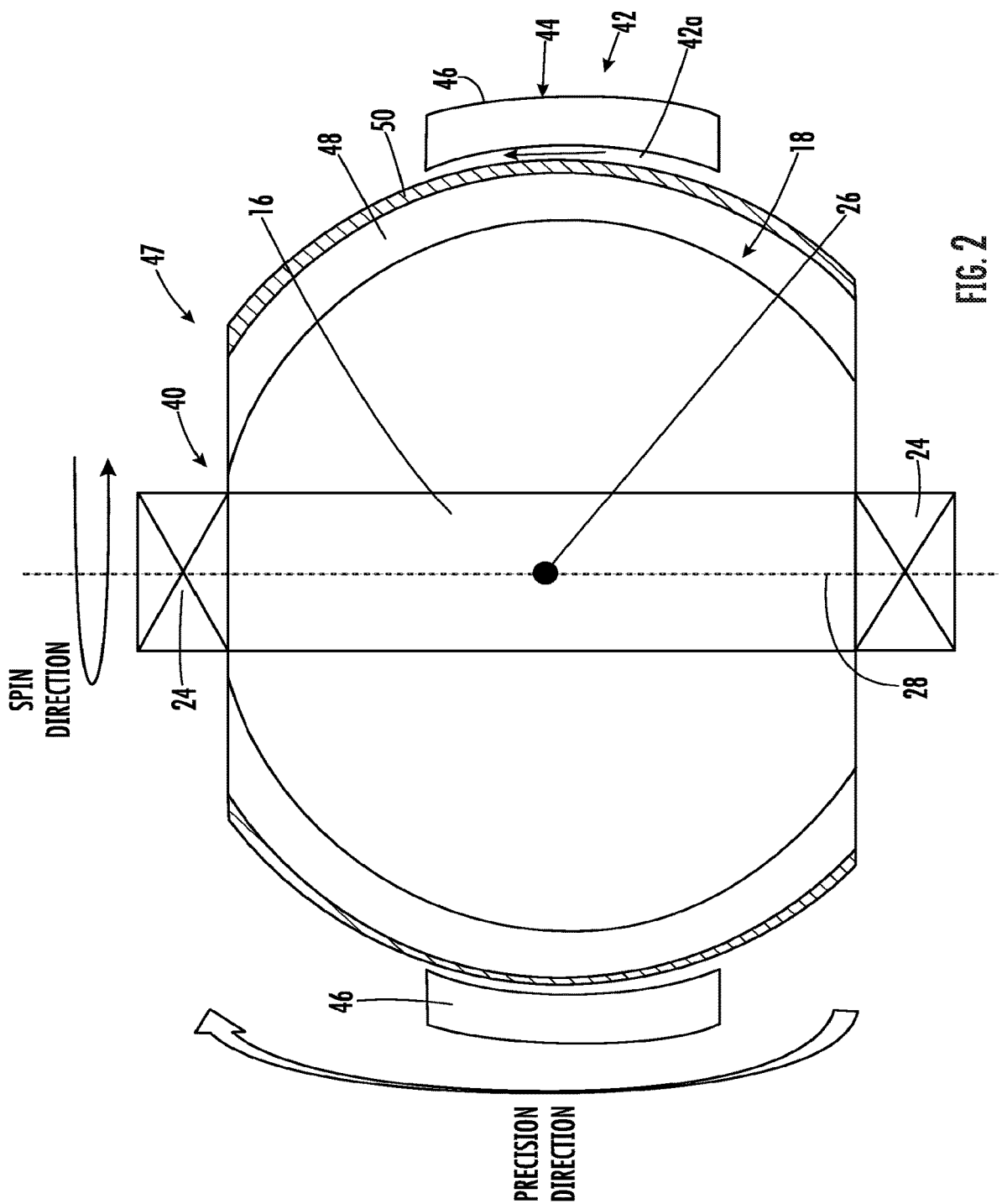
FIG. 2 is a top view of a portion of an inner body of a vibration control assembly according to an embodiment.
Figure 3:
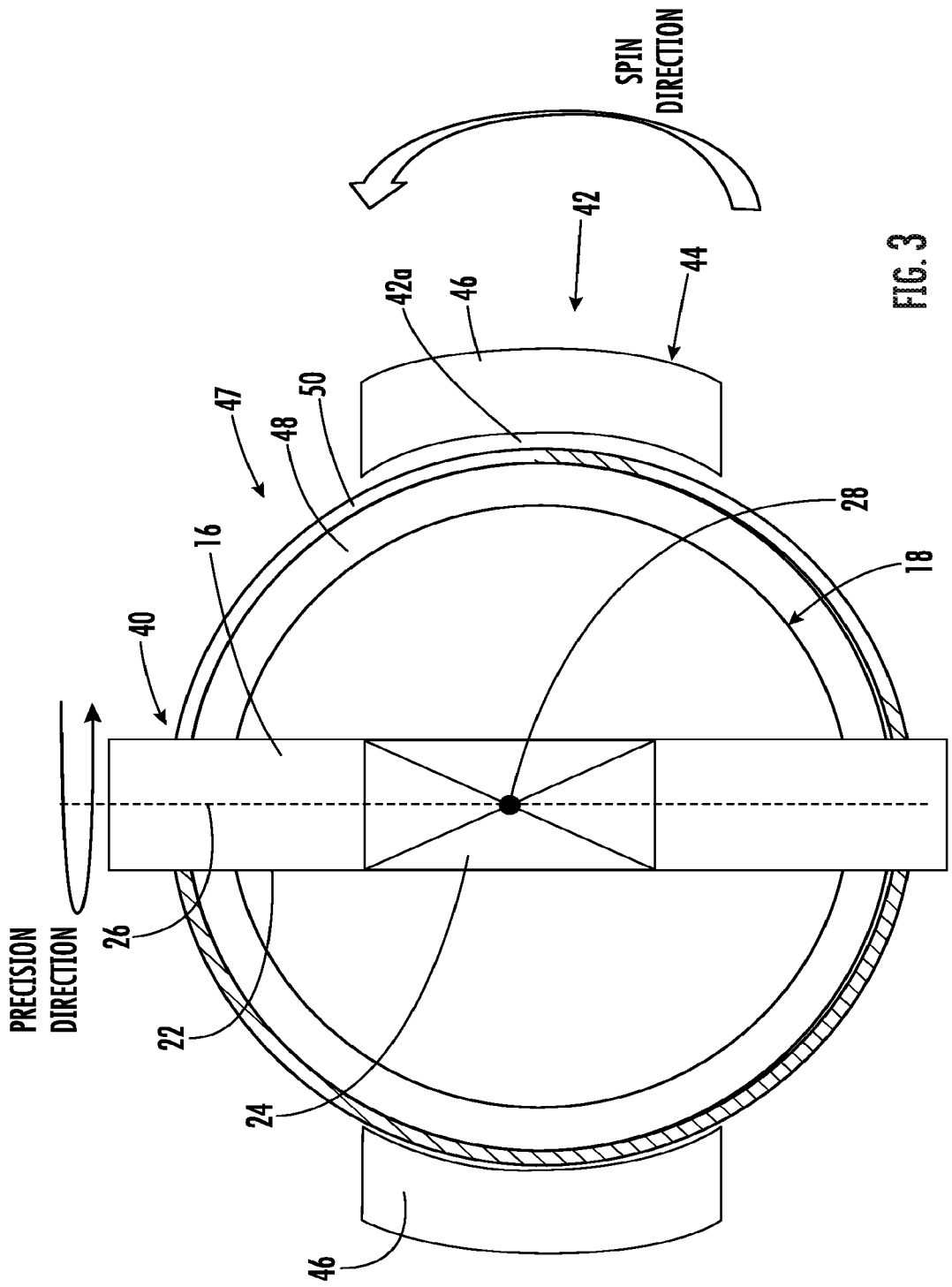
FIG. 3 is a front view of the portion of an inner body of FIG. 2 according to an embodiment.
Figure 4:
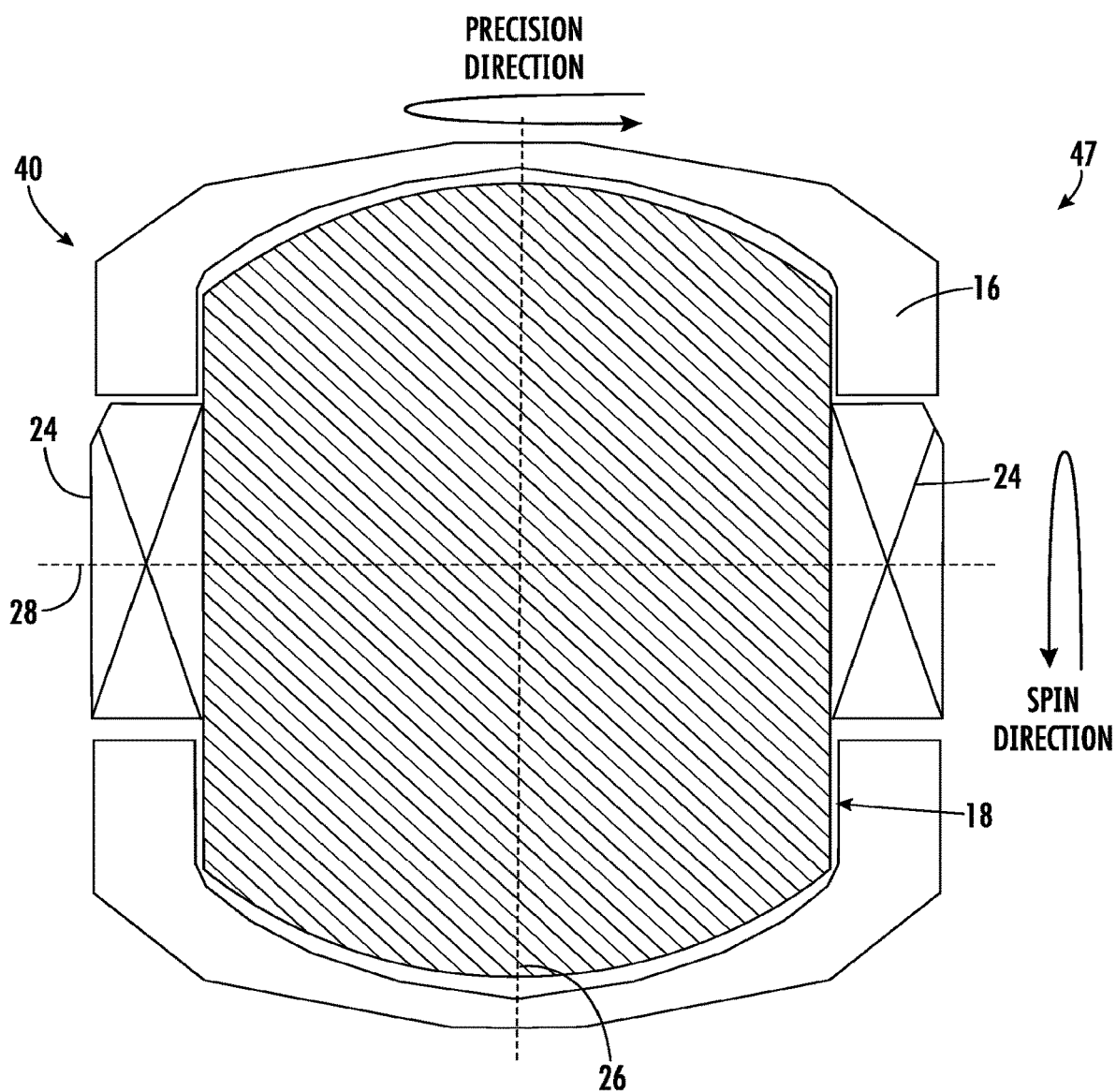
FIG. 4 is side view of the portion of an inner body of FIG. 2 according to an embodiment.

With reference now to FIGS. 2-4, a magnetic driving source 42 acts through an airgap 42a and is employed to facilitate rotation of at least a portion of the inner body. In an embodiment, the driving source 42 is operable to rotate the cage 16 about the first axis 26. In another embodiment, the driving source 42 is operable to rotate the gyroscope wheel 18 about the second axis 28. In some embodiments, the driving source 42 is operable to rotate the inner body including the cage 16 and the wheel about the first axis 26. Alternatively, the driving source 42 may be operable to rotate the cage 16 about the first axis 26 and the gyroscope wheel 18 about the second axis 28. In embodiments where the driving source 42 can rotate the cage 16 about the first axis 26 and the gyroscope wheel 18 about the second axis 28, the cage 16 and the gyroscope wheel 18 are rotatable both simultaneously and also independently.

The driving source 42 acting through airgap 42a is an electric motor having a stator assembly 44 and a rotor assembly 47 embedded within the housing 12, and specifically, at least partially embedded within the inner mass 40. The electric motor is configured to drive rotation of at least one of the cage 16 and the gyroscope wheel 18 about the first axis 26 and the second axis 28, respectively. The stator assembly 44 is rigidly mounted within the interior region 14 of the housing 12. The rotor assembly 47 is rotatably mounted within the interior region 14 of the housing 12. The stator assembly 44 includes at least one stator coil 46 mounted adjacent to, but offset from the inner mass 40 by the airgap 42a. With reference to FIG. 1, wiring associated with the at least one stator coil may extend through a housing 12 into the interior region 14 to selectively deliver power to the at least one stator coil 46 (FIG. 3). In an embodiment, stator coils 46 are positioned adjacent opposite sides of the gyroscope wheel 18; however, embodiments where the stator assembly 44 includes only a single stator coil 46, or embodiments where the stator assembly 44 includes a plurality of stator coils 46 that are mounted at the same side or adjacent sides of the gyroscope wheel 18 and/or cage 16 are also within the scope of the disclosure. The total number of stator coils 46 included in the stator assembly 44 of the driving source 42 may vary based on the desired performance of the driving source 42.

The rotor assembly 47 includes a portion of the inner mass 40, for example by the gyroscope wheel 18. In the non-limiting embodiment illustrated in FIGS. 2-4, the driving source 42 is an induction motor. Accordingly, the rotor assembly 47 includes a ferrous metal material, also known as a ferromagnetic material. In the illustrated, non-limiting embodiment, the gyroscope wheel 18 includes a layered construction where one or more layers or portions of the gyroscope wheel 18 are formed from a ferromagnetic material. For example, a first layer 48 including an iron material may be arranged about at least a portion of the outer periphery of the gyroscope wheel 18 and a second layer 50, such as formed from an electrically conductive material, such as aluminum or copper plating, may be disposed outwardly and in overlapping relationship with the first layer. Alternatively, the entire body of the gyroscope wheel 18 may be formed from a ferromagnetic material, such as steel or iron for example.

During operation of the electric motor, the stator coils 46 of the stator assembly 44 generate an alternating magnetic field when supplied with a high-frequency current. When the at least one stator coil 46 is energized, the alternating magnetic fields generated between the stator coil 46 and the ferromagnetic materials of the first layer 48 induce a current in the conductive layer 50 of the rotor assembly 47. The magnetic fields generated as a result of the current induced in the conductive layer 50 react against the magnetic fields of the stator assembly 44. The interaction between the rotating magnetic field of the stator assembly 44 and the magnetic fields of the induced current produce a torque which causes the rotor assembly 47 to rotate. Accordingly, the magnetic field and torque of the induction motor may be controlled to achieve rotation of the cage 16 about the first axis 26 (also referred to herein as precession) and/or rotation of the gyroscope wheel 18 about the second axis 28 (also referred to herein as spin). As will be appreciated, rotation of the cage 16 controls precession of the gyroscope wheel 18. As the cage 16 is rotated, the gyroscope wheel 18 rotates with the cage 16, thereby imparting precession. The combination of rotation of the gyroscope wheel 18 and the cage 16 generates a gyroscopic moment. The magnitude of the gyroscopic moment is equal to the product of the precession speed, the gyroscope wheel speed and the polar mass moment of inertia of the gyroscope wheel 18.

Figure 5:
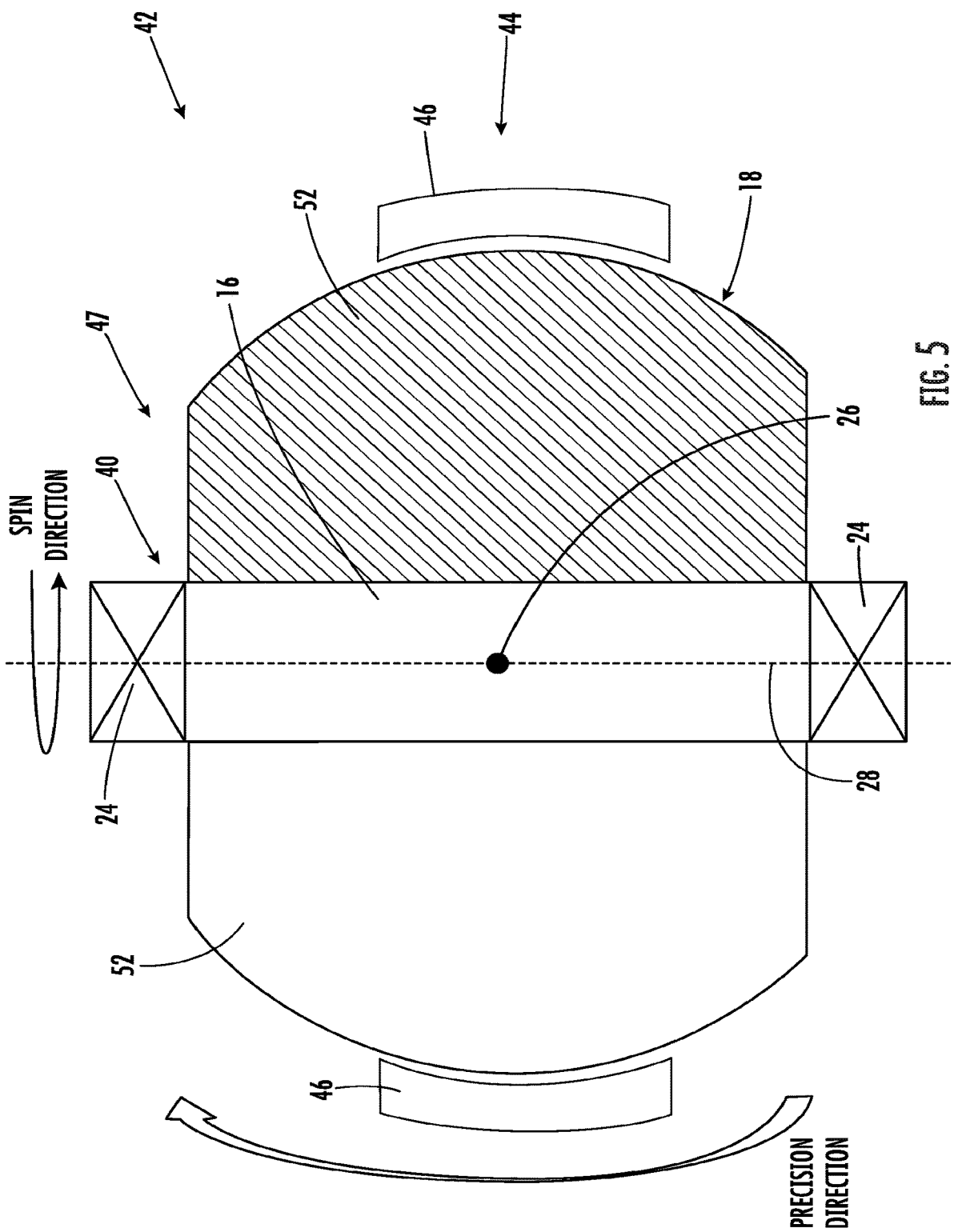
FIG. 5 is a top view of a portion of an inner body of a vibration control assembly according to another embodiment.
Figure 6:
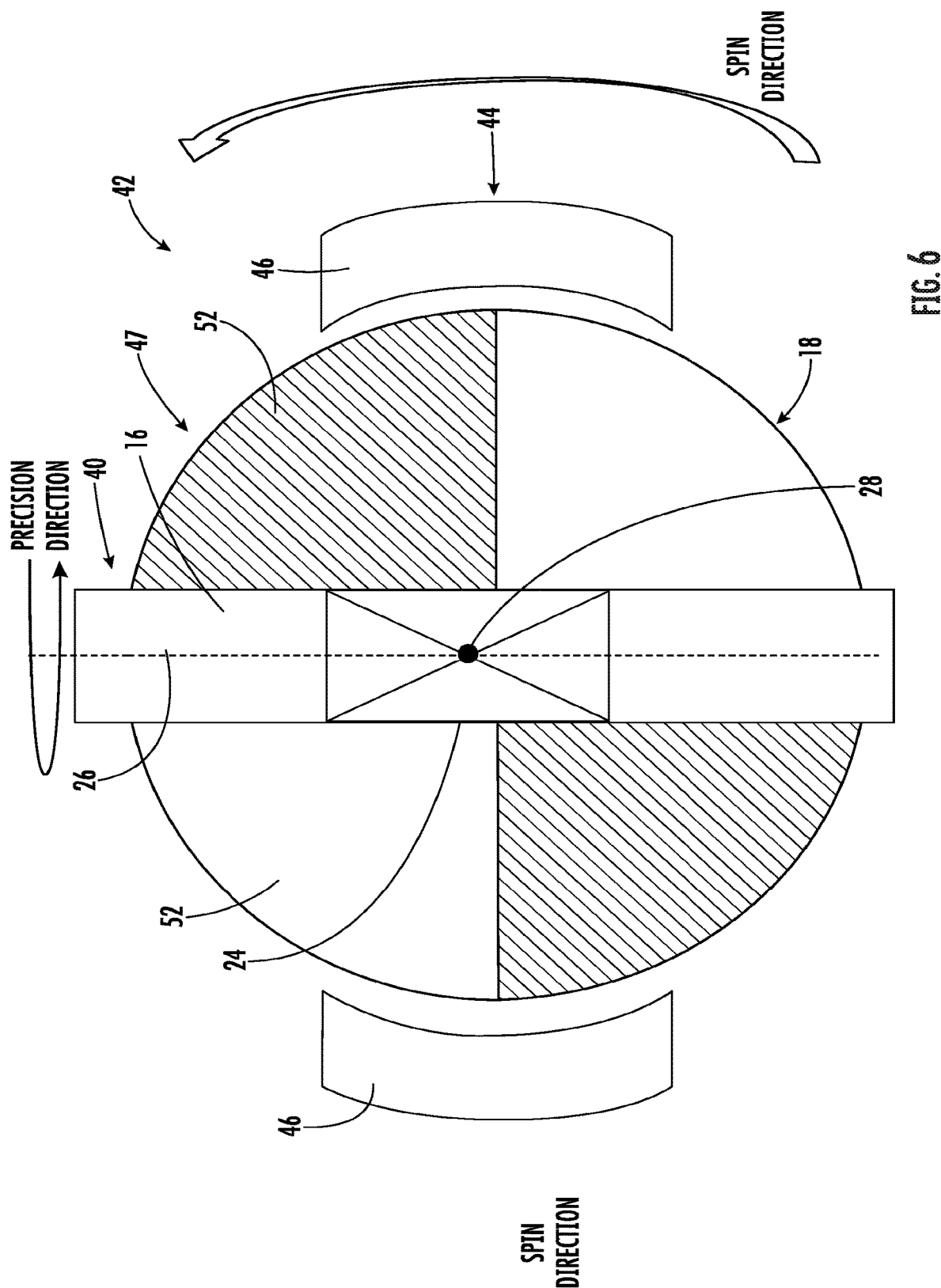
FIG. 6 is a front view of the portion of an inner body of FIG. 5 according to an embodiment.
Figure 7:
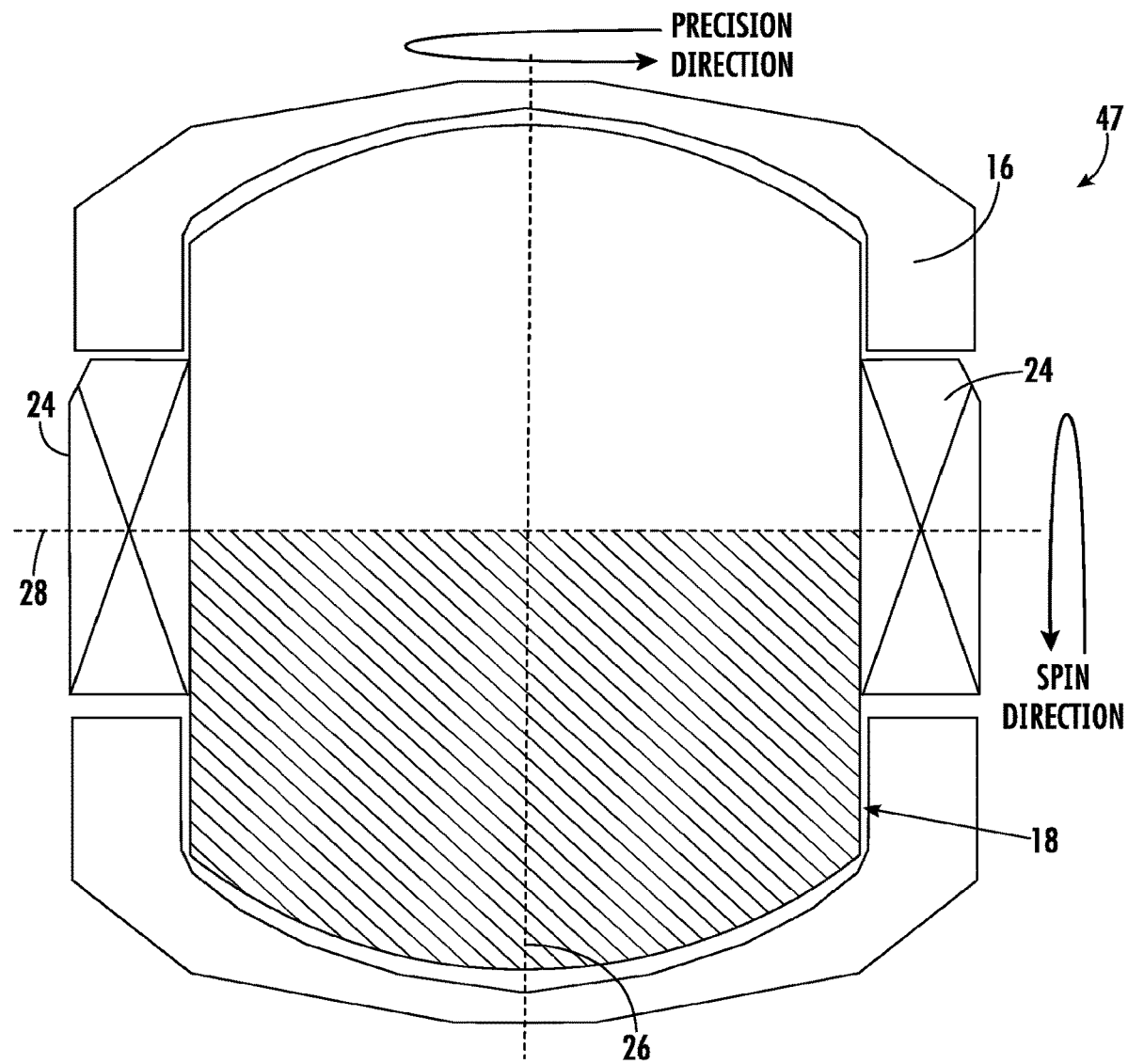
FIG. 7 is a side view of the portion of an inner body of FIG. 5 according to an embodiment.

With reference now to FIGS. 5-7, in yet another embodiment, the driving source 42 is a brushless motor, such as a direct current motor for example. In such embodiments, the rotor assembly 47 includes one or more permanent magnets 52 mounted to the inner mass 40. As shown, the magnets 52 are mounted about an outer periphery of the gyroscope wheel 18. In an embodiment, the magnets 52 are fixedly or removably mounted to the exterior surface of the gyroscope wheel 18. In another embodiment, the magnets 52 are partially or fully embedded within the gyroscope wheel 18 such as within one or more complementary openings (not shown) formed therein.

The magnets 52 may cover the entire surface of the gyroscope wheel 18, or alternatively, may be spaced at intervals. In embodiments where the magnets 52 are spaced at intervals, the magnets 52 may, but need not be, equidistantly spaced about the gyroscope wheel 18. Further, in the illustrated, non-limiting embodiment, adjacent magnets 52 have an opposite orientation. For example, a north end of a first magnet 52 is positioned adjacent a south end of a second magnet 52, and a south end of the first magnet 52 is positioned adjacent a north end of either the second magnet, or another magnet 52. Although two magnets 52 are shown in the FIGS., it should be understood that any suitable number of magnets 52 may be mounted to the rotor assembly 47.

During operation of the electric motor, a current is supplied to the at least one stator coil 46 of the stator assembly 44, and as a result, an induced magnetic field is generated. In an embodiment, the stator coil 46 is an electromagnetic coil. The rotor assembly 47 is configured to rotate with respect to the stator assembly 44, for example about the first axis 26 and/or the second axis 28, as the magnets 52 of the rotor assembly 47 react with the induced magnetic field of the stator assembly 44.

Figure 8:
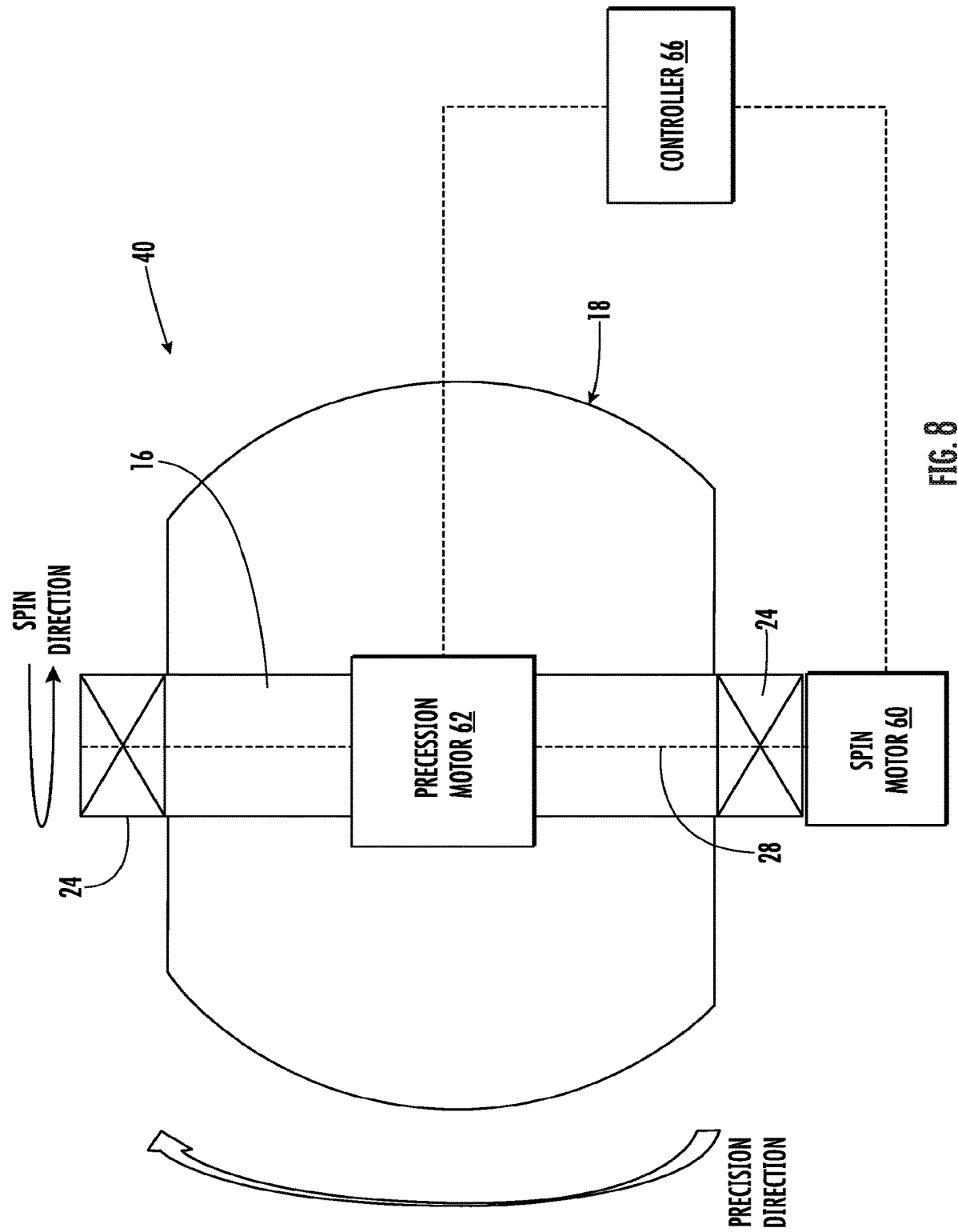
FIG. 8 is a top view of a portion of an inner body of a vibration control assembly according to another embodiment.
Figure 9:
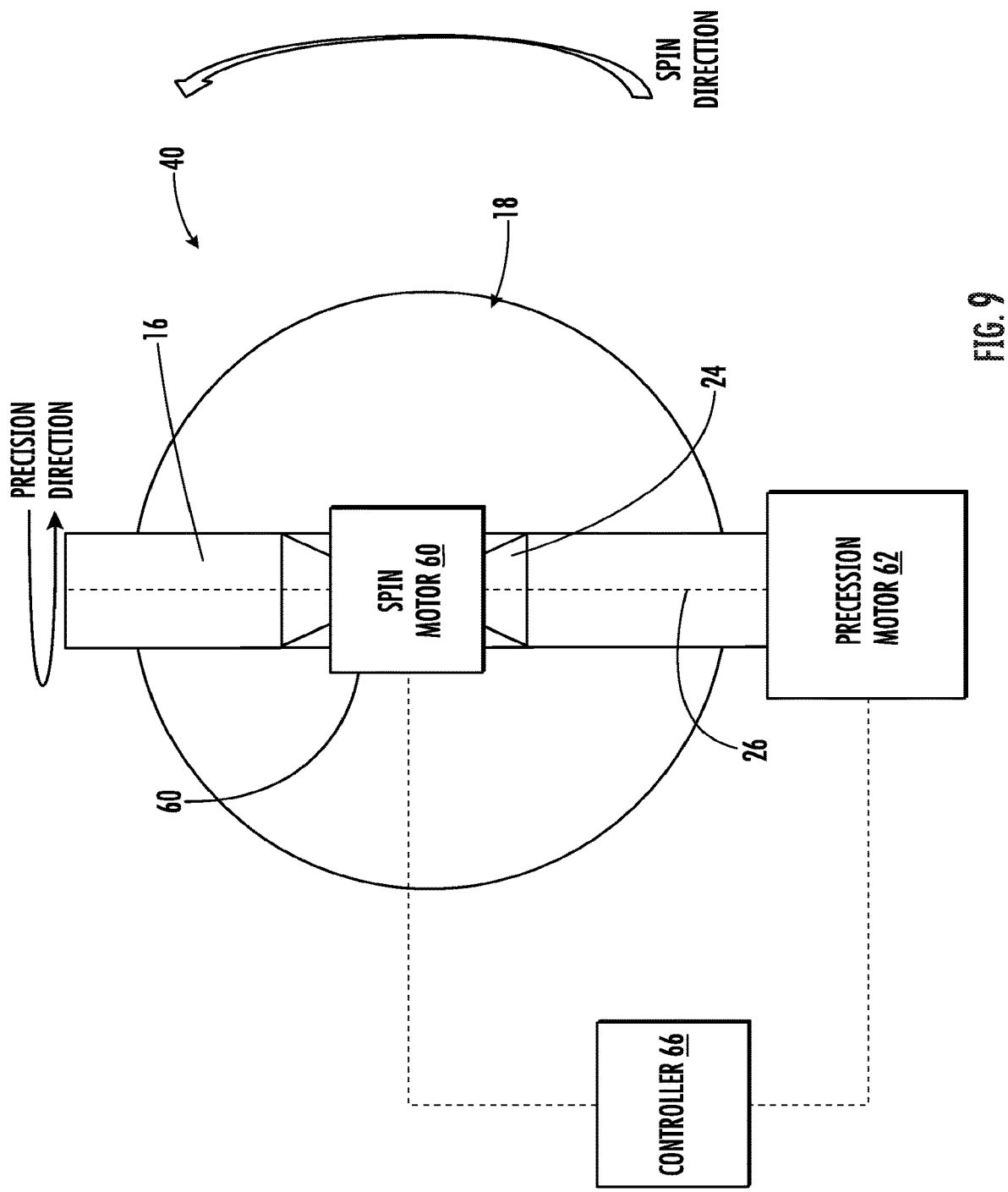
FIG. 9 is a front view of the portion of an inner body of FIG. 8 according to an embodiment.
Figure 10:
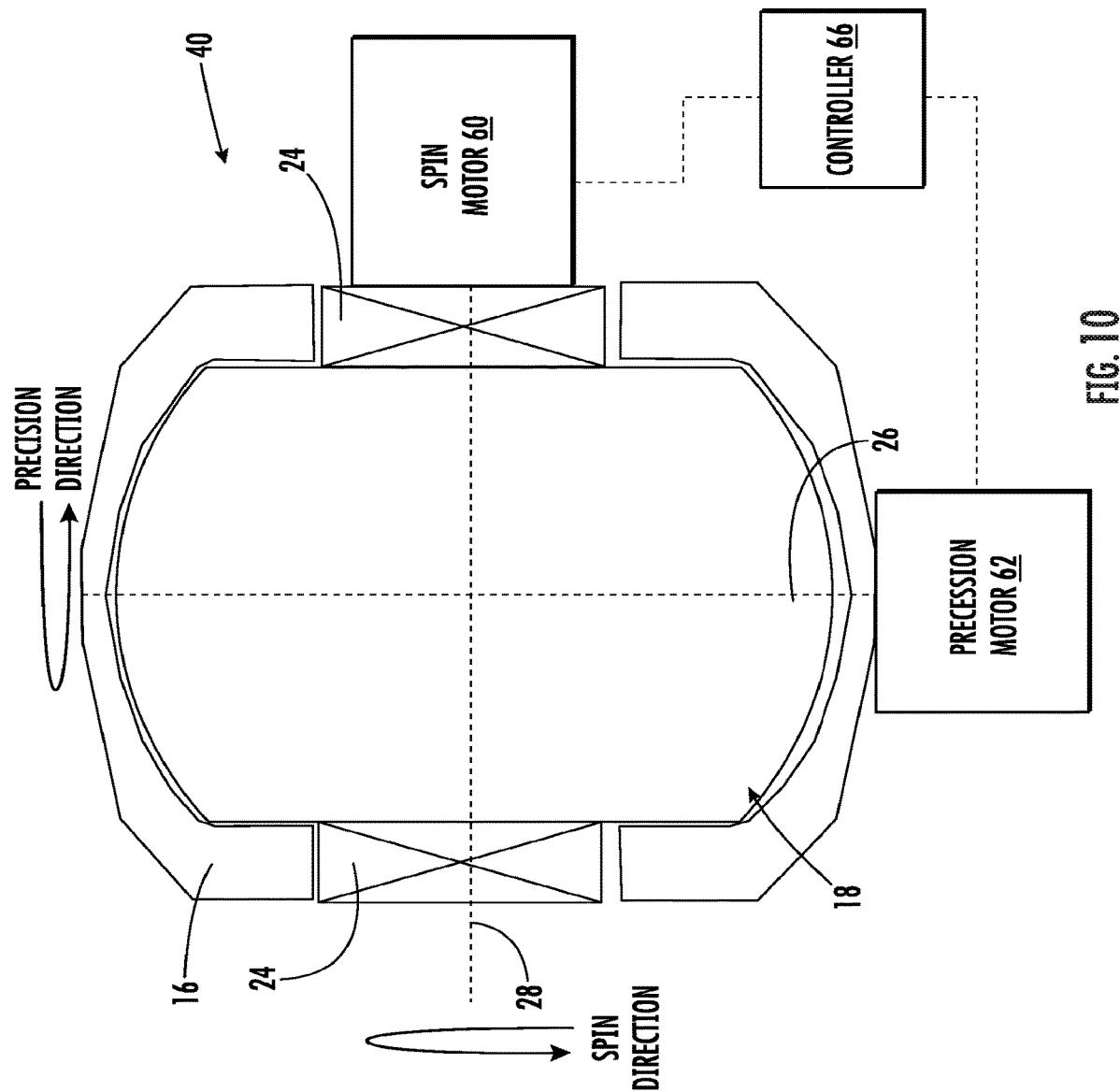
FIG. 10 is a side view of the portion of an inner body of FIG. 8 according to an embodiment.

With reference now to FIGS. 8-10, a vibration control assembly 10 having yet another configuration is illustrated. As shown, the vibration control assembly 10 includes a first driving source 60 operable to rotate the gyroscope wheel 18 about the second axis 28. For example, the first driving source 60 may be coupled to an end of the gyroscope shaft 22 or a gyroscope bearing 24. The driving source 60 rotates with the cage about the first axis 26. Power from the first driving source 60 causes the gyroscope shaft 22, and hence the gyroscope wheel 18, to spin about the second axis 28. In an embodiment, the motor speed is variable, for example between 0 and about 20,000 rpm, depending upon the desired moment output which may be monitored and/or controlled by a controller, illustrated schematically at 66. However, embodiments where either the gyroscope wheel 18 or the cage 16 are rotated at a constant speed are also within the scope of the disclosure. The first driving source 60 may be connected to a power supply (not shown) and/or the controller via one or more wires extending from the cage 16 rotating about the first axis 26 to the non-rotating frame of the housing 12, such as by means of an electrical slip ring for example. In another embodiment, power is provided to the first driving source 60 via a wireless connection. For example, the first driving source may be powered via wireless induction. However, any suitable manner of wireless power is contemplated herein.

With continued reference to FIGS. 8-10, rotation of the cage 16 may be driven by a second driving source 62. The second driving source 62 may be directly or indirectly coupled to the cage 16. In an embodiment, the rotational speed and phase of the second driving source 62 is controllable. The first driving source 60 and the second driving source 62 are independently operable; however, both driving sources 60, 62 may be operably coupled to the same processor or controller. Further, power may be provided to the second driving source either via a wired or wireless connection. In an embodiment, at least one of the first driving source and the second driving source is mounted within the interior region 14 of the housing 12. For example, either the first driving source 60, the second driving source 62, or both the first and second driving sources 60, 62 are mountable within the interior region 14 of the housing 12. In an embodiment, the first driving source 60 may rotate with either the cage 16 or the gyroscope wheel 18 within the interior region 14.

In this embodiment, the stator of the first driving source 60 may be embedded in the cage 16 and the rotor of the first driving source 60 may be embedded in the gyroscope wheel 18. In another embodiment, the stator of the second driving source 62 may be embedded in the housing 12 and the rotor of the second driving source 62 may be embedded in the cage 16

Figure 11:
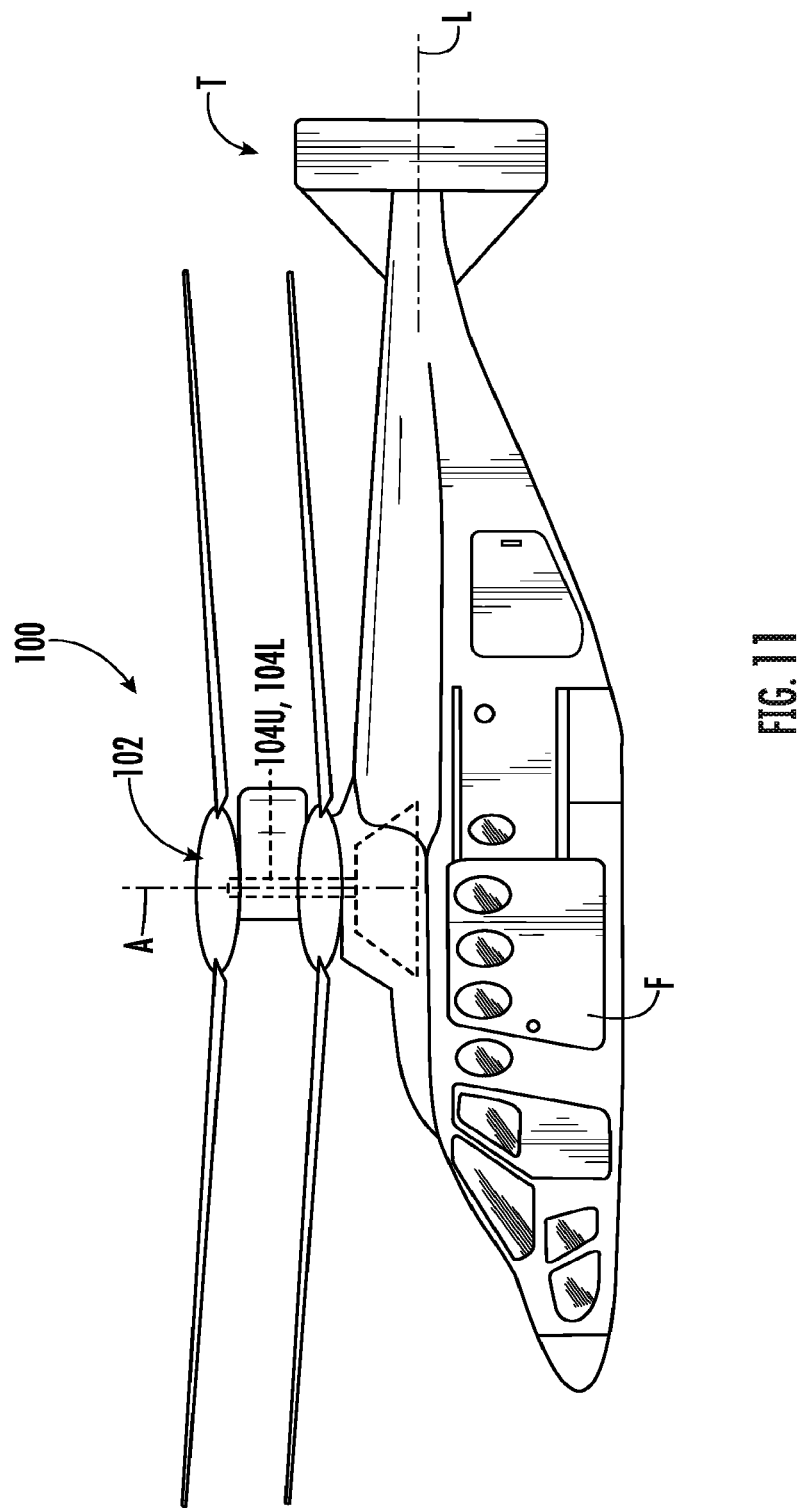
FIG. 11 is a schematic view of an example of an aircraft for use with a vibration control assembly according to an embodiment.

FIG. 11 illustrates an example of an aircraft using the vibratory control assembly according to an embodiment. In particular, a rotary-wing aircraft 100 having a dual, counter-rotating, coaxial rotor system 102 which rotates about a rotating main rotor shaft 104U, and a counter-rotating main rotor shaft 104L both about an axis of rotation A. The rotary-wing aircraft 100 includes an airframe F which supports the dual, counter rotating, coaxial rotor system 102 as well as an optional translational thrust system T which provides translational thrust during high speed forward flight generally parallel to an aircraft longitudinal axis L. Although a particular aircraft configuration is illustrated in the disclosed embodiment, other counter-rotating, coaxial rotor systems, will also benefit from the present invention, as well as conventional single rotor aircraft and/or tilt rotor aircraft. One or more control assemblies may be mounted on a portion of the main rotor system, such as one or both of the upper and lower rotors 104U, 104L. Alternatively, or in addition, one or more control assemblies may be mounted at another location of the aircraft, such as the translational thrust system, or about the airframe for example.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft comprising:
   an airframe;
   a main rotor system mounted to the airframe, wherein the main rotor system is rotatable about a rotor axis and which imparts a vibration into the airframe; and
   at least one vibration control assembly operably coupled to at least one of the main rotor system and the airframe to suppress the vibration, the at least one vibration control assembly including:
   a housing having an interior region;
   an inner mass disposed within the interior region of the housing, the inner mass rotatable about a first axis and including a second portion rotatable about a second axis; and
   a driving source mounted within the interior region of the housing, the driving source operable to interact with a magnetic field of the inner mass to rotate the inner mass about the first axis;
   wherein the driving source is operable to drive rotation of the second portion about the second axis, wherein the driving source is configured to control a rotational speed of the second portion about the second axis and a rotational speed of the inner mass about the first axis, wherein the rotational speed of the second portion does not depend on the rotational speed of the inner mass.

2. The aircraft of claim 1, wherein the at least one vibration control assembly includes a plurality of vibration control assemblies spaced about the aircraft.

3. The aircraft of claim 1, wherein the driving source is operable to rotate the inner mass about both the first axis and the second axis.

4. The aircraft of claim 1, wherein the driving source is a motor including a stator assembly and a rotor assembly and the inner mass defines the rotor assembly.

5. The aircraft of claim 4, wherein the driving source is an induction motor and the inner mass includes a ferromagnetic material.

6. The aircraft of claim 4, wherein the driving source is a brushless motor and the inner mass includes one or more permanent magnets.

7. The aircraft of claim 1, wherein the inner mass further comprises a cage rotatable within the housing about the first axis; and the second portion comprises a gyroscope wheel disposed within the cage.

8. The aircraft of claim 7, wherein at least one of the cage and the second portion is rotated at a constant speed.

9. The aircraft of claim 1, further comprising a second rotor system mounted to the airframe, wherein the second rotor system is rotatable about the rotor axis in a direction opposite the rotation of the main rotor system, wherein the at least one vibration control assembly comprises a first vibration control assembly mounted to the main rotor system and a second vibration control assembly mounted to the second rotor system.

10. The aircraft of claim 1, further comprising a translational thrust system, wherein the at least one vibration control assembly comprises a first vibration control assembly mounted to the translational thrust system.

11. A vibration control assembly comprising:
   a housing having an interior region;
   an inner mass including:
   a cage disposed within the interior region of the housing, wherein the cage is rotatable within the housing about a first axis; and
   a gyroscope wheel disposed within the cage and rotatable about a second axis other than the first axis;
   a first driving source comprising a stator operable to interact with a magnetic field of the inner mass to drive rotation of the inner mass about the first axis, wherein the first driving source is mounted within the interior region of the housing; and
   a second driving source operatively coupled to the gyroscope wheel to rotate the gyroscope wheel about the second axis, wherein the second driving source is powered wirelessly and rotates with the cage about the first axis.

12. The vibration control assembly of claim 11, further comprising a controller operably coupled to both the first driving source and the second driving source, the controller configured to control a first speed of the first driving source and a second speed of the second driving source based on a desired moment output.

13. The vibration control assembly of claim 12, wherein the controller is configured to control the first speed of the first driving source independently of the second speed of the second driving source.

14. The vibration control assembly of claim 12, wherein the controller is configured to operate at least one of the first driving source or the second driving source at a constant speed.

15. The vibration control assembly of claim 11, wherein the second driving source is coupled to the gyroscope wheel so as to rotate with the gyroscope wheel about the second axis.

16. The vibration control assembly of claim 11, wherein the stator of the first driving source is embedded in the housing and a rotor of the first driving source is embedded in the cage.

17. The vibration control assembly of claim 11, wherein the second driving source comprises a stator embedded in the cage and a rotor embedded in the gyroscope wheel.

* * * * *